United States Patent
Yamaguchi (10) Patent No.: US 8,975,552 B2
(45) Date of Patent: Mar. 10, 2015

(54) WORKPIECE HOLDER FOR HOLDING A PLURALITY OF PLATE WORKPIECES USED FOR WIRE ELECTRIC DISCHARGE MACHINE

(71) Applicant: Fanuc Corporation, Yamanashi (JP)

(72) Inventor: Meguru Yamaguchi, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 83 days.

(21) Appl. No.: 13/791,037

(22) Filed: Mar. 8, 2013

(65) Prior Publication Data
US 2013/0277347 A1   Oct. 24, 2013

(30) Foreign Application Priority Data
Apr. 20, 2012   (JP) .................. 2012-096820

(51) Int. Cl.
B23H 11/00   (2006.01)
B23H 7/02   (2006.01)

(52) U.S. Cl.
CPC .............. *B23H 11/003* (2013.01); *B23H 7/02* (2013.01)
USPC .................................. 219/69.11; 219/69.12

(58) Field of Classification Search
CPC ........... B23H 11/003; B23H 7/02; B23Q 1/03
USPC ................................ 219/69.11, 69.12; 269/95
See application file for complete search history.

(56) References Cited

U.S. PATENT DOCUMENTS

| | | | | |
|---|---|---|---|---|
| 5,019,129 | A | * | 5/1991 | Johanson ................... 269/71 |
| 5,981,895 | A | * | 11/1999 | Grace et al. ............. 219/69.12 |
| 7,922,159 | B2 | * | 4/2011 | Troxler ........................ 269/71 |

FOREIGN PATENT DOCUMENTS

| | | | |
|---|---|---|---|
| CH | 668331 | A5 | 12/1988 |
| JP | 61260937 | A | 11/1986 |
| JP | 62-157723 | A * | 7/1987 |
| JP | 6-047625 | A | 2/1994 |
| JP | 2003220427 | A | 8/2003 |
| JP | 2007216352 | A | 8/2007 |
| JP | 2008-80413 | A * | 4/2008 |

OTHER PUBLICATIONS

Decision to Grant a Patent mailed Aug. 20, 2013, corresponds to Japanese patent application No. 2012-096820.
Extended European Search Report issued Oct. 10, 2014, corresponding to European patent application No. 13157283.6.

* cited by examiner

*Primary Examiner* — Geoffrey S Evans
(74) *Attorney, Agent, or Firm* — Lowe Hauptman & Ham, LLP (57) ABSTRACT

A plurality of plate-like workpieces held by a workpiece holder are subjected to discharge machining by a wire electric discharge machine. The workpiece holder includes a cylindrical member in which the plurality of plate-like workpieces are housed in a stacked state, lid members placed on upper and lower ends of the plate-like workpieces housed in the cylindrical member so as to press the plate-like workpieces, and a workpiece stage mount member having an insertion hole in which the cylindrical member is inserted and housed. Concave sections are formed in positions corresponding to a machining start point and a machining end point on an inner circumference surface of the cylindrical member.

2 Claims, 7 Drawing Sheets

WORKPIECE HOLDER FOR HOLDING A PLURALITY OF PLATE WORKPIECES USED FOR WIRE ELECTRIC DISCHARGE MACHINE

RELATED APPLICATIONS

The present application is based on, and claims priority from, Japanese Application Number 2012-096820, filed Apr. 20, 2012, the disclosure of which is hereby incorporated by reference herein in its entirety.

BACKGROUND OF THE INVENTION

1. Field of the Invention

The present invention relates to a plate-like workpiece holder used for a wire electric discharge machine when stacked workpieces are machined to reduce machining time per workpiece.

2. Description of the Related Art

When a plurality of plate-like workpieces are machined by a wire electric discharge machine, if the plurality of plate-like workpieces stacked are machined, the machining time per workpiece can be reduced. However, when the plurality of workpieces stacked are secured, the machining time or machining precision may be adversely affected depending on the method of securing the plurality of workpieces. Accordingly, the plurality of workpieces need to be secured to prevent a generation of space between workpieces that causes a wire break during wire electric discharge machining or reduction in the machining precision. For example, Japanese Patent Application Laid-Open No. 6-47625 discloses a securing tool for stack cutting that secures, in a tightening manner, upper and lower metal plates to a machining workpiece stage with a plurality of securing bolts.

A force to hold stacked plate-like workpieces is applied only in a vertical direction (Z-axis direction). However, there is no force that holds these stacked plate-like workpieces in a horizontal direction (X-axis direction) or an anteroposterior direction (Y-axis direction), so the stacked workpieces deviate. If the stacked plate-like workpieces are held in the horizontal direction (X-axis direction) or the anteroposterior direction (Y-axis direction), the stacked plate-like workpieces are deformed by the holding force and the space between the stacked plate-like workpieces is generated, thereby causing a wire break as described above. In addition, a wire electric discharge machine cannot be used until the plurality of plate-like workpieces are secured to the wire electric discharge machine, so the availability rate of the wire electric discharge machine is reduced.

The securing tool for stack cutting disclosed in the above Japanese Patent Application Laid-Open No. 6-47625 secures the upper and lower metals plates to the machining workpiece stage using the plurality of securing bolts, so the tightening force is unlikely to become even in some places, a space is generated between stacked upper and lower metal sheets, the speed of electric discharge machining is different between the stacked upper and lower metal sheets, or the tightening force of securing bolts becomes uneven as the cutting position in an object to be machined advances during electric discharge machining by the wire electrode.

SUMMARY OF THE INVENTION

The object of the present invention is, in view of the above problems of the prior art technique, to provide a workpiece holder for holding a plurality of plate-like workpieces used for a wire electric discharge machine that can hold the plurality plate-like workpieces precisely in close contact with each other when the plurality plate-like workpieces are held in a stacked state, and can perform efficient wire electric discharge machining.

The present invention relates to a plate-like workpiece holder for holding a plurality of plate-like workpieces used for a wire electric discharge machine, wherein the wire electric discharge machine relatively moves a wire electrode stretched between upper and lower wire guides with respect to the plurality of plate-like workpieces stacked on a workpiece stage so as to machine the plurality of plate-like workpieces stacked. The workpiece holder for holding the plurality of plate-like workpieces stacked includes: a cylindrical member in which the plurality of plate-like workpieces are held in a stacked state and which has an inner circumference surface where concave sections corresponding to a machining start point and a machining end point are provided; lid members that are mounted on an upper end and a lower end of the cylindrical member to press the plurality of plate-like workpieces; and a workpiece stage mount member which is secured to the workpiece stage and which has an insertion hole in which the cylindrical member is inserted and housed.

A projection or an elastic member that holds the plurality of plate-like workpieces may be provided in a predetermined position on the inner circumference surface of the cylindrical member.

A projection or an elastic member that holds the plurality of plate-like workpieces may be provided on surfaces of the lid members that face the plurality of plate-like workpieces.

Each of the lid members may be divided according to a machining path of the plurality of plate-like workpieces.

According to the present invention, it is possible to provide a workpiece holder for holding a plurality of plate-like workpieces used for a wire electric discharge machine that can hold the plurality of plate-like workpieces precisely in close contact with each other when the plurality plate-like workpieces are held in a stacked state and can perform efficient wire electric discharge machining.

BRIEF DESCRIPTION OF THE DRAWINGS

The forgoing and other objects and feature of the invention will be apparent from the following description of preferred embodiments of the invention with reference to the accompanying drawings, in which.

DETAILED DESCRIPTION OF THE PREFERRED EMBODIMENTS

First, a plate-like workpiece holder according to an embodiment of the present invention will be described with reference to FIGS. 1A to 4B.

Figure 1A:
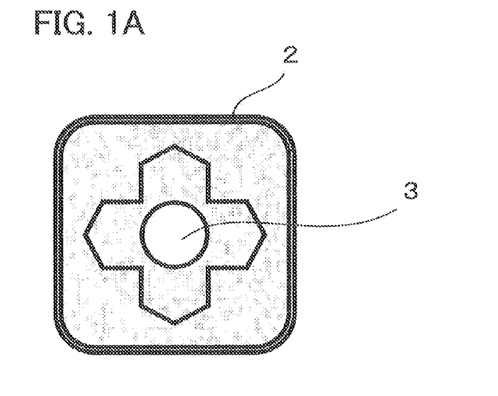
FIGS. 1A and 1B show an example of one plate-like workpiece.
Figure 1B:
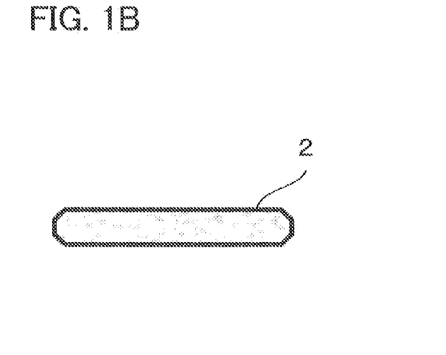

FIGS. 1A and 1B show an example of one plate-like workpiece. A plate-like workpiece 2 is a substantially rectangular thin-plate with a hole 3 at the center thereof as shown in the plan view in FIG. 1A and upper, and lower surfaces of which are parallel to each other as shown in FIG. 1B.

Figure 3A:
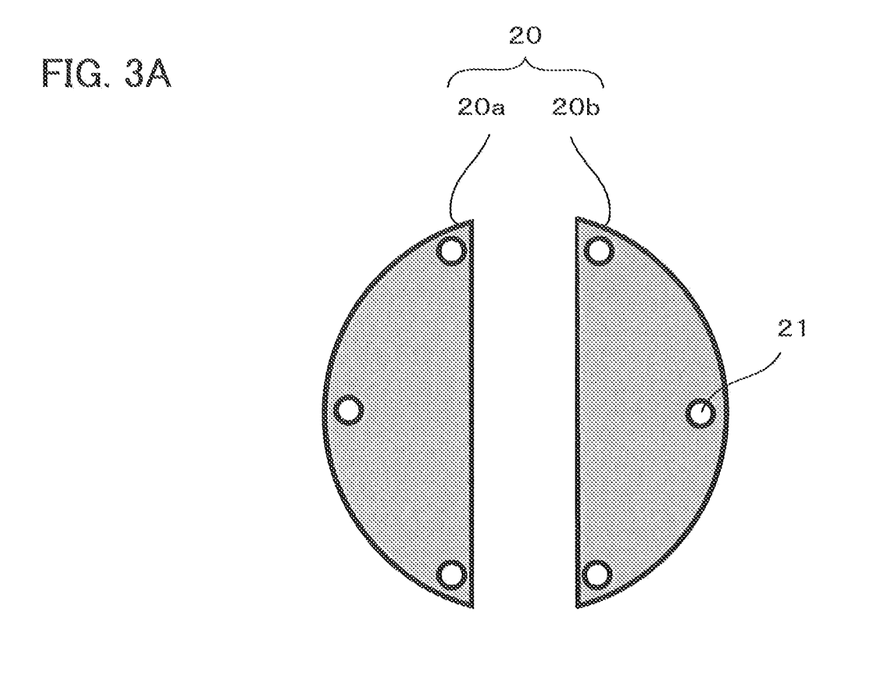
FIGS. 3A to 3C show an example of upper and lower lid members included in the plate-like workpiece holder according to the present invention, wherein the lid members press the upper end and lower end of the plate-like workpieces shown in FIGS. 1A and 1B stacked and housed in the cylindrical member shown in FIGS. 2A and 2B.
Figure 3B:
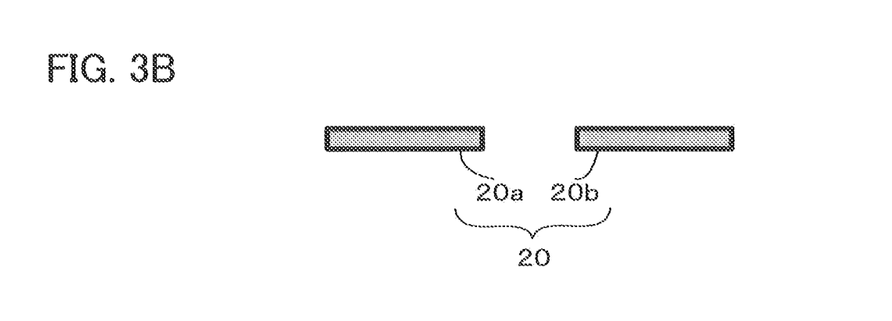
Figure 3C:
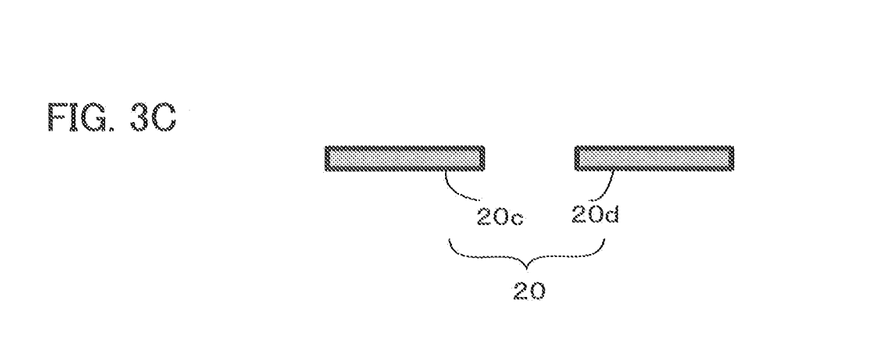
Figure 4A:
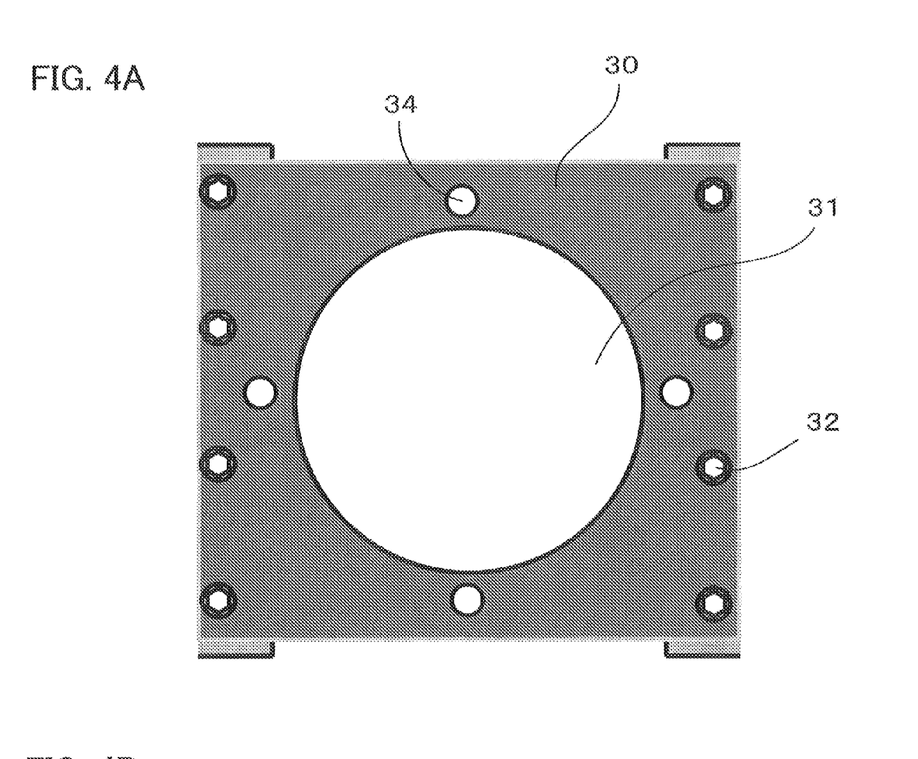
FIGS. 4A and 4B show an example of a workpiece stage mount member included in the plate-like workpiece holder according to the present invention, wherein the cylindrical member shown in FIGS. 2A and 2B in which a plurality of plate-like workpieces are held and the upper and lower lid members shown in FIGS. 3A to 3C are secured to the workpiece stage mount member.
Figure 4B:
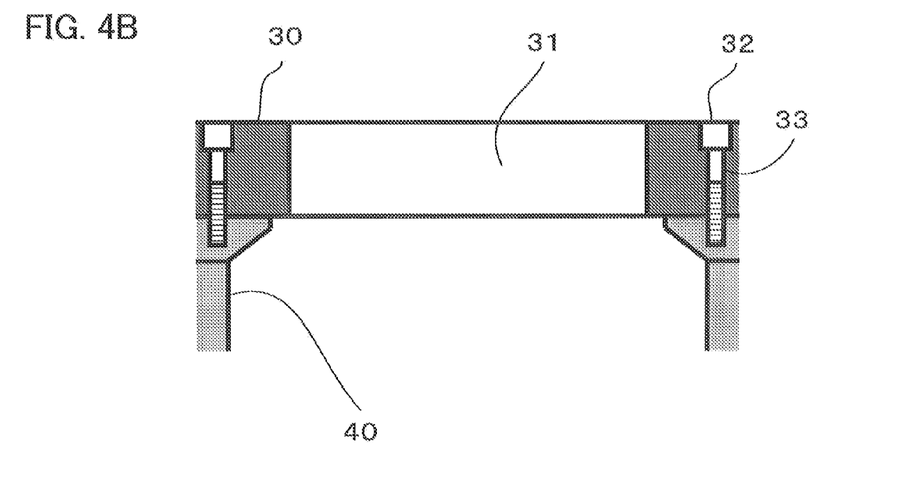

The workpiece holder for holding a plurality of the plate-like workpieces shown in FIGS. 1A (plan view) and 1B (side view) includes a cylindrical member 10 (see FIGS. 2A and 2B), upper and lower lid members 20 (see FIGS. 3A to 3C), and a workpiece stage mount member 30 (see FIGS. 4A and 4B). This workpiece holder is used for wire electric discharge machines.

Figure 2A:
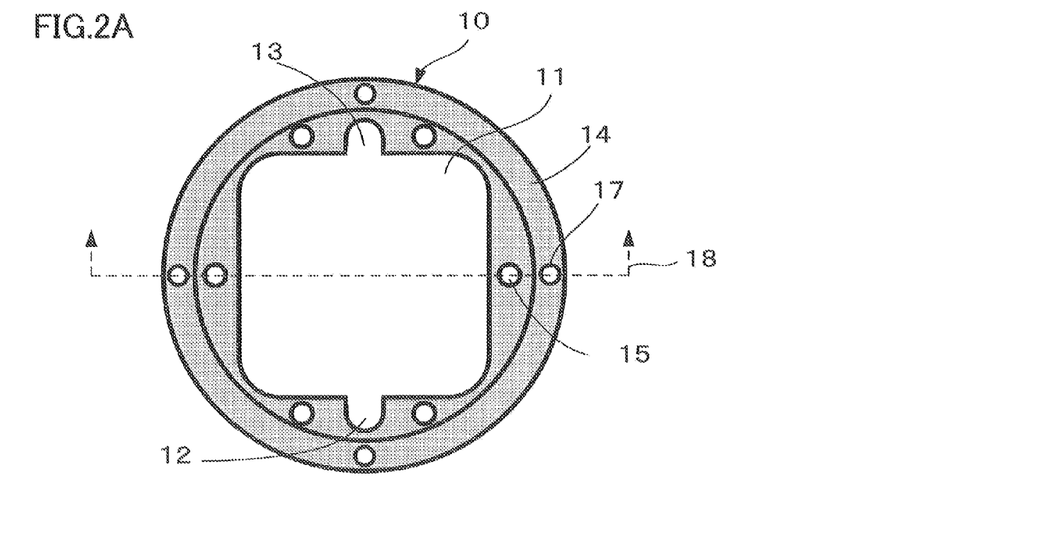
FIGS. 2A and 2B show an example of a cylindrical member included in a plate-like workpiece holder according to the present invention, wherein a plurality of the plate-like workpieces shown in FIGS. 1A and 1B are stacked and housed in the cylindrical member.
Figure 2B:
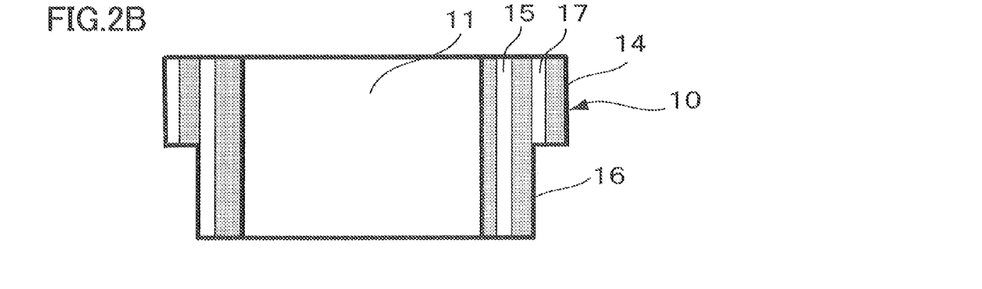

First, an example of the cylindrical member 10 included in the workpiece holder will be described with reference to FIGS. 2A and 2B. FIG. 2A is a top view and FIG. 2B is a cross-sectional view taken along a dashed line 18.

The cylindrical member 10 includes a through hole 11 in which the plurality of plate-like workpieces 2 are inserted and housed, a flange 14 for supporting the cylindrical member 10 via the workpiece stage mount member 30 (described later), bolt holes 15 into which securing bolts 5 (see FIG. 8A) are inserted, bolt holes 17 into which securing bolts 7 (see FIG. 8A) are inserted, and an insertion section 16, which is inserted into an insertion hole 31 of the workpiece stage mount member 30. Concave sections 12 and 13 are disposed in positions that correspond to the machining start point and the machining end point of wire electric discharge machining, respectively, on an inner circumference surface of the through hole 11.

Next, an example of the lid members 20 included in the workpiece holder will be described with reference to FIGS. 3A to 3C. FIG. 3A is a top view of the lid member 20, FIG. 3B is a side view of the lid member 20 secured to the upper surface of the cylindrical member 10 with the securing bolts 5, and FIG. 3C is a side view of the lid member 20 secured to the lower surface of the cylindrical member 10 with the securing bolts 5.

The lid members 20 are placed on the upper end and lower end of the cylindrical member 10 in which the plurality of plate-like workpieces 2 are housed so as to press the upper end and the lower end of the plate-like workpieces 2. The lid member 20 mounted on the upper surface of the cylindrical member 10 includes a member 20a and a member 20b, which are symmetrical. Similarly, the lid member 20 mounted on the lower surface of the cylindrical member 10 includes a member 20c and a member 20d, which are symmetrical. In this embodiment, these members 20a, 20b, 20c, and 20d included in the lid members 20 have the same shape, and bolt holes 21 that correspond to the bolt holes 15 disposed in the cylindrical member 10 are provided in the members 20a, 20b, 20c, and 20d, respectively. Insertion of the securing bolts 5 (see FIG. 8A) into the bolt holes 15 and the bolt holes 21 can secure the upper lid member 20 and the lower lid member 20 to the upper surface and the lower surface of the cylindrical member 10, respectively.

This causes the cylindrical member 10 to prevent the plurality of plate-like workpieces 2 from moving in the anteroposterior direction or in the horizontal direction and causes the upper and lower lid members 20 to prevent the plurality of plate-like workpieces 2 from moving in the vertical direction. In addition, the plate-like workpieces 2 may be held by providing a projection or an elastic member on surfaces of the cylindrical member 10 and the lid members 20 that face the plate-like workpieces 2. The projection or elastic member to be provided may be detachable.

Next, an example of the workpiece stage mount member included in the workpiece holder will be described with reference to FIGS. 4A and 4B. FIG. 4A is a top view as viewed from above and FIG. 4B is a cross-sectional view of the workpiece stage mount member of FIG. 4A.

The workpiece stage mount member 30 has the insertion hole 31 into which the insertion section 16 of the cylindrical member 10 is inserted, bolt holes 33 into which securing bolts 32 are screwed, and bolt holes 34 into which the securing bolts 7 to be screwed into bolt holes 17 formed in the flange 14 of the cylindrical member 10 are screwed. The workpiece stage mount member 30 is secured to a workpiece stage 40 of the machine body (not shown) of a wire electric discharge machine with the securing bolts 32, as shown in FIG. 4B.

Next, stacking and holding of a plurality of plate-like workpieces 2 shown in FIGS. 1A and 1B in the workpiece holder shown in FIGS. 2A to 4B and securing of the workpiece holder that holds the plurality of plate-like workpieces 2 to the workpiece stage 40 (see FIG. 4B) will be described with reference to FIGS. 5A to 7B.

As described above, the workpiece holder includes the cylindrical member 10, the upper and lower lid members 20, and the workpiece stage mount member 30. The cylindrical member 10 houses a plurality of plate-like workpieces 2 and holds the ends of these plate-like workpieces 2 in their horizontal direction and anteroposterior direction, the upper and lower lid members 20 holds the upper and lower ends of the plurality of plate-like workpieces 2 housed in the cylindrical member 10, and the workpiece stage mount member 30 secures the cylindrical member 10 that has housed the plurality of plate-like workpieces 2 to the lid members 20 placed on the upper and lower ends of the plurality of plate-like workpieces 2.

Figure 5A:
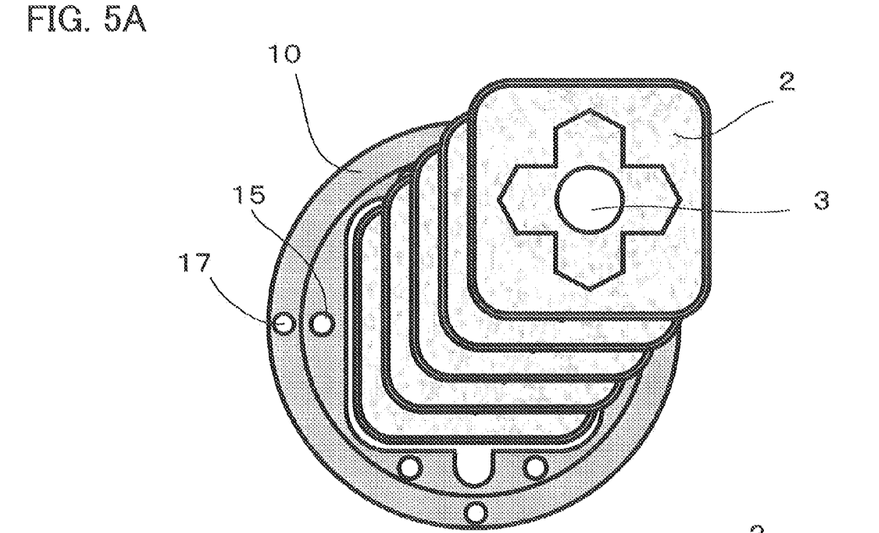
FIGS. 5A and 5B show the stacking and inserting of the plurality of the plate-like workpieces shown in FIGS. 1A and 1B in the cylindrical member shown in FIGS. 2A and 2B.
Figure 5B:
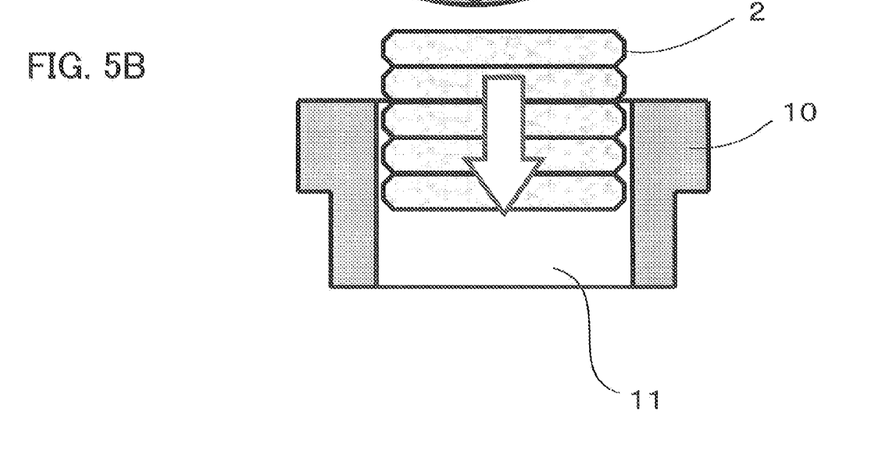
Figure 6A:
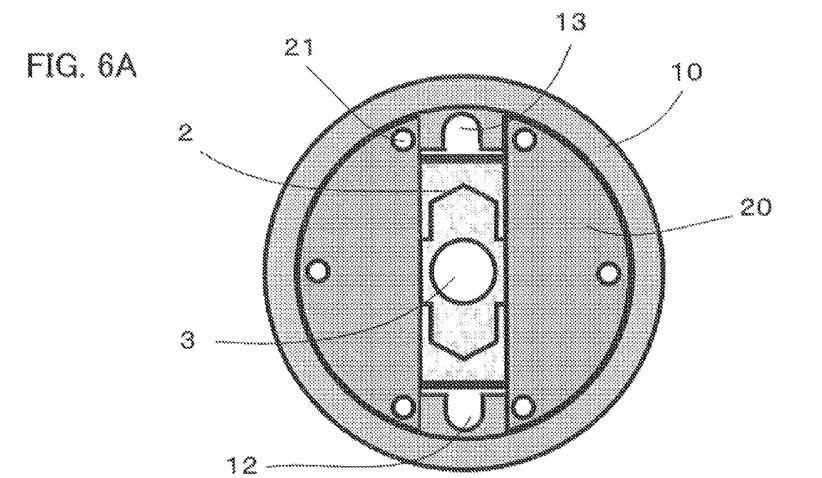
FIGS. 6A and 6B show the holding of the upper end and lower end of the plate-like workpieces stacked and inserted in the cylindrical member shown in FIGS. 2A and 2B using the lid members shown in FIGS. 3A to 3C.
Figure 6B:
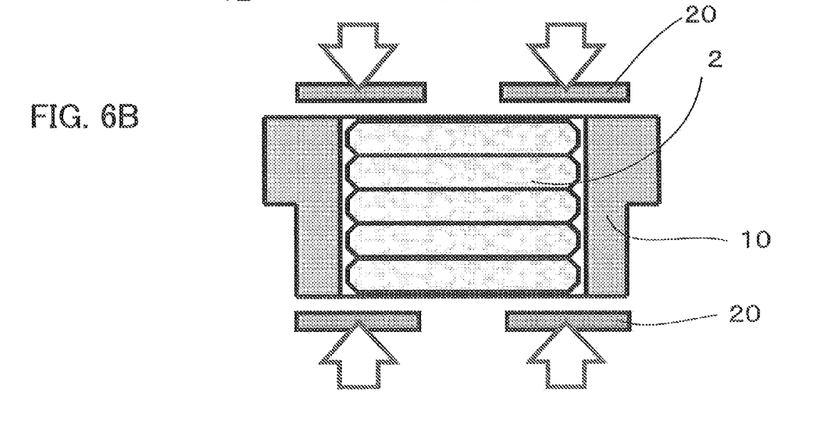

As shown in FIGS. 5A and 5B, the plurality of plate-like workpieces 2 are stacked and inserted into the through hole 11 of the cylindrical member 10 (see the arrow in FIG. 5B). In addition, as shown in FIGS. 6A and 6B, the lid members 20 are placed on the upper end and the lower end of the plurality of plate-like workpieces 2 housed in the through hole 11 of the cylindrical member 10 so as to press the upper end and the lower end of the plurality of plate-like workpieces 2 (see the arrows in FIG. 6B). This holds the ends in the horizontal direction, the anteroposterior direction, and vertical direction of the plurality of the plate-like workpieces 2 stacked (see the arrows in FIG. 6B).

Figure 7A:
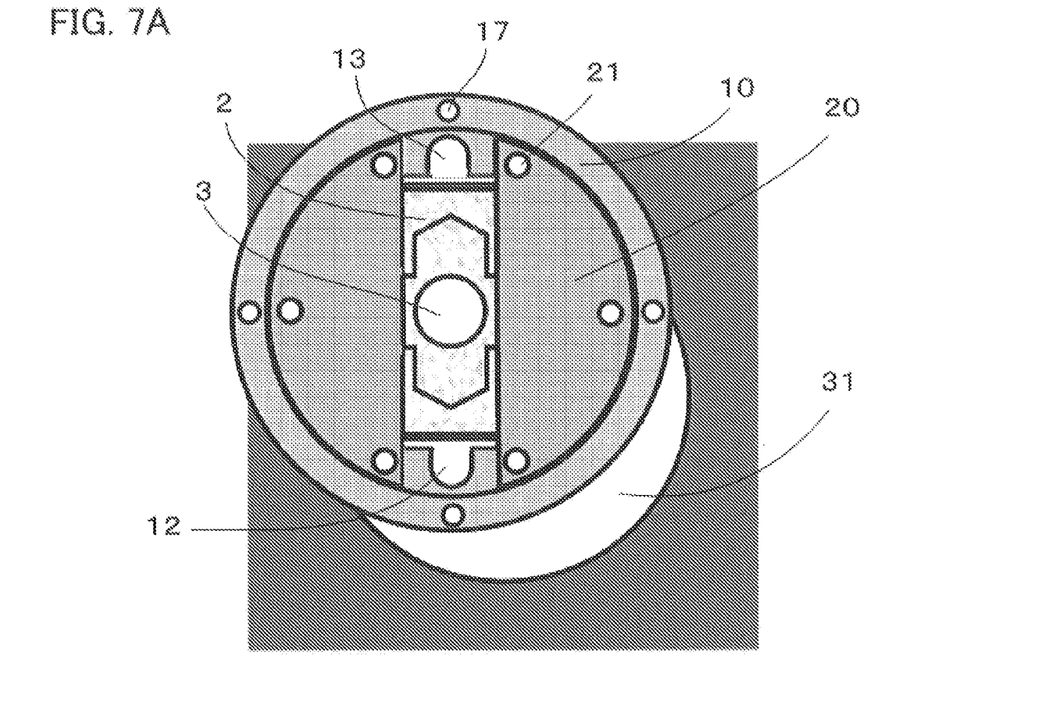
FIGS. 7A and 7B show the mounting of the cylindrical member that holds the plurality of workpieces as shown in FIGS. 6A and 6B and the upper and lower lid members on the workpiece stage mount member shown in FIGS. 4A and 4B.
Figure 7B:
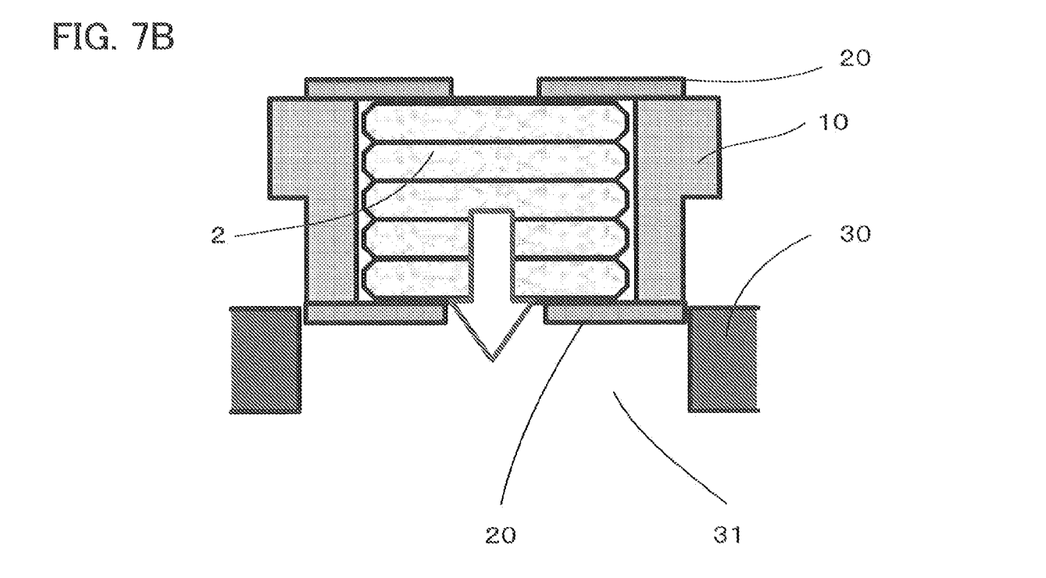

Then, as shown in FIGS. 7A and 7B, the cylindrical member 10 in which the plurality of plate-like workpieces 2 are held in a stacked state and the lid members 20 are mounted on the workpiece stage mount member 30 secured to the workpiece stage 40 of the wire electric discharge machine with the securing bolts 5 (see FIG. 8A) screwed into the bolt holes 15 of the cylindrical member 10 and the bolt holes 21 of the lid members 20 in a state where the plate-like workpieces 2 is held (see the arrow in FIG. 7B).

Figure 8A:
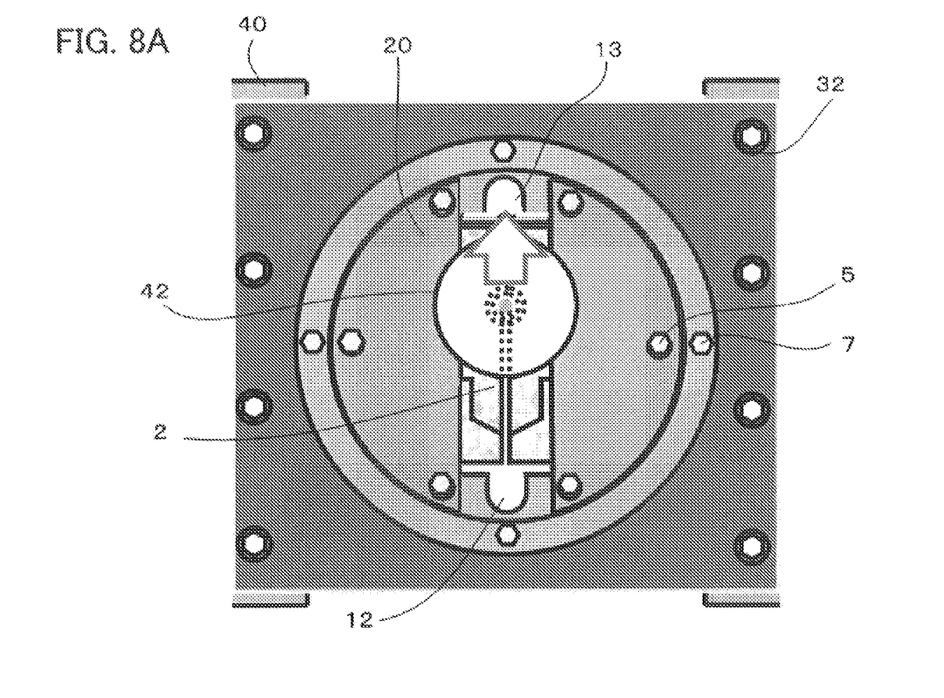
FIGS. 8A and 8B show the machining of the plurality of plate-like workpieces held by the cylindrical member attached to the workpiece stage mount member as shown in FIGS. 7A and 7B and the upper and lower lid members using a wire electric discharge machine.
Figure 8B:
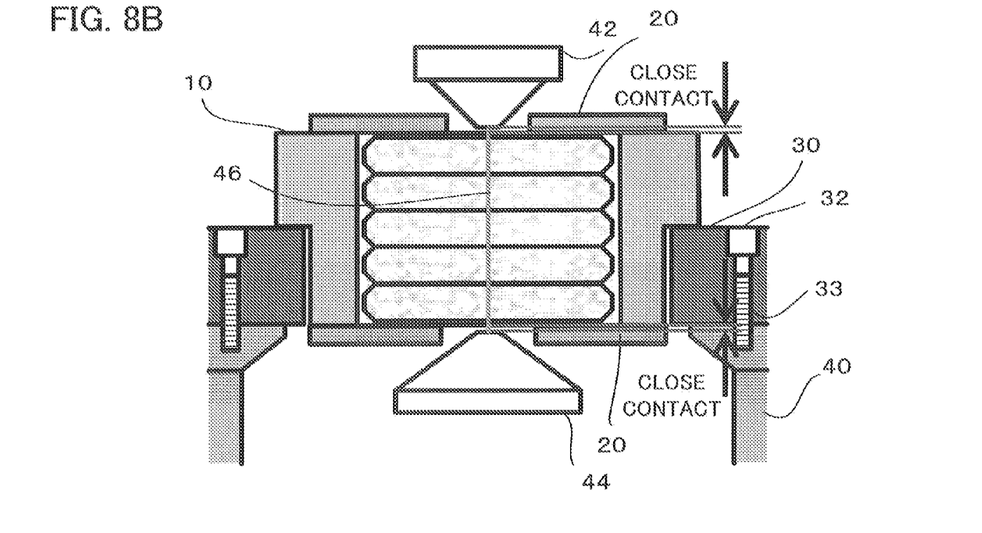

Next, how a plurality of plate-like workpieces 2 held by the workpiece holder (including the cylindrical member 10, the upper and lower lid members 20, and the workpiece stage mount member 30) are machined by a wire electric discharge machine will be described with reference to FIGS. 8A and 8B.

After moving the X-axis and Y-axis of the wire electric discharge machine to the concave section 12 (see FIG. 8A) formed in a position that corresponds to the machining start point of wire electric discharge machining on the inner circumference surface of the through hole 11 of the cylindrical member 10 in which a plurality of plate-like workpieces 2 is inserted and housed, wire electric discharge machining is started upon completion of connection of a wire electrode 46 passing through an upper nozzle 42 of an upper guide part and a lower nozzle 44 of a lower guide part. Since wire electric discharge machining is completed when wire electric discharge machining proceeds and reaches the concave section 13 formed in a position that corresponds to the machining end point of wire electric discharge machining on the inner circumference surface of the through hole 11 of the cylindrical member 10, the wire electrode 46 is cut in this position.

The cylindrical member 10 that holds the plurality of plate-like workpieces 2 for which electric discharge machining was completed and the lid members 20 are removed from the workpiece stage mount member 30. Alternatively, the cylindrical member 10 that holds the plurality of plate-like workpieces 2 and the lid members 20 may be mounted on the workpiece stage mount member 30 secured in advance to a different position on the workpiece stage 40, and, as in the above case, the X-axis and Y-axis of the wire electric discharge machine may be moved to the concave section 12 (see FIG. 8A) formed in a position that corresponds to the machining start point of wire electric discharge machining on the inner circumference surface of the through hole 11 of the mounted cylindrical member 10 in order to perform wire electric discharge machining.

As described above, the workpiece holder of the present invention that holds a plurality of plate-like workpieces, used for electric discharge machines, has the following effects more advantageous than the prior art.

(1) Since the plate-like workpieces 2 can be held precisely in close contact with each other if the plate-like workpieces 2 are held in a stacked state, efficient wire electric discharge machining is enabled.

(2) Since the workpiece holder can hold the plurality of plate-like workpieces 2 housed in the cylindrical member 10 via lid members 20 at the outside of the body of the wire electric discharge machine, it is possible to prepare the workpiece holder for holding the plate-like workpieces 2 regardless of the operation state of the wire electric discharge machine, thereby enabling efficient wire electric discharge machining.

(3) Since the workpiece holder can be secured to the wire electric discharge machine in a state where the plate-like workpieces 2 are held and wire electric discharge machining can be performed in a state where the plate-like workpieces 2 are held, thereby enabling efficient wire electric discharge machining.

(4) Since the plate-like workpieces 2 make closely contact with the upper nozzle 42 and the lower nozzle 44 of the wire electric discharge machine when the cylindrical member 10 that housed the plate-like workpieces 2 and the lid members 20 are mounted on the workpiece stage mount member 30 of the wire electric discharge machine, machining fluid from the upper nozzle 42 and the lower nozzle 44 can be efficiently supplied to a part undergoing electric discharge during wire electric discharge machining, thereby enabling efficient wire electric discharge machining.

(5) Since the concave sections 12 and 13 corresponding to the machining start point and the machining end point required for wire electric discharge machining are provided in advance in the cylindrical member 10, wire electric discharge machining is not blocked when the workpieces are held via the lid members 20, thereby enabling efficient wire electric discharge machining.

(6) Since the concave sections 12 and 13 corresponding to the machining start point and the machining end point are not held by members included in the workpiece holder in the mounting of the cylindrical member 10 having housed the plurality of plate-like workpieces 2 and the lid members 20 on the workpiece stage mount member 30, wire electric discharge machining is not blocked, thereby enabling efficient wire electric discharge machining.

(7) Since the workpiece holder holds the plate-like workpieces 2 to prevent movement in the horizontal direction (X-axis direction) and the anteroposterior direction (Y-axis direction) in addition to the vertical direction (Z-axis direction), the plate-like workpieces 2 can be secured with little deviation and space between the stacked workpieces.f

The invention claimed is:

1. A plate workpiece holder for holding a plurality of plate workpieces used for a wire electric discharge machine, in which the wire electric discharge machine relatively moves a wire electrode stretched between upper and lower wire guides with respect to the plurality of plate workpieces stacked on a workpiece stage so as to machine the plurality of plate workpieces stacked, the workpiece holder for holding the plurality of plate workpieces stacked comprising:

a cylindrical member in which the plurality of plate workpieces are held in a stacked state and which has an inner circumference surface where concave sections corresponding to a machining start point and a machining end point are provided;

lid members that are mounted on an upper end and a lower end of the cylindrical member to press the plurality of plate workpieces; and a workpiece stage mount member which is secured to the workpiece stage and which has an insertion hole in which the cylindrical member is inserted and housed.

2. The plate workpiece holder according to claim 1, wherein each of the lid members is divided according to a machining path of the plurality of plate workpieces.

* * * * *